(12) United States Patent
Rimer et al.

(10) Patent No.: US 12,024,452 B2
(45) Date of Patent: Jul. 2, 2024

(54) DUAL NUCLEATION AND GROWTH INHIBITORS OF MINERAL SCALE

(71) Applicant: University of Houston System, Houston, TX (US)

(72) Inventors: Jeffrey D. Rimer, Houston, TX (US); Xi Geng, Pearland, TX (US); Ricardo Sosa, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 17/878,258

(22) Filed: Aug. 1, 2022

(65) Prior Publication Data
US 2023/0030968 A1 Feb. 2, 2023

Related U.S. Application Data

(60) Provisional application No. 63/228,391, filed on Aug. 2, 2021.

(51) Int. Cl.
*C02F 5/10* (2023.01)
(52) U.S. Cl.
CPC ..................................... *C02F 5/10* (2013.01)
(58) Field of Classification Search
CPC ..................................... C02F 5/08; C02F 5/10
See application file for complete search history.

(56) References Cited

U.S. PATENT DOCUMENTS

| | | | |
|---|---|---|---|
| 10,689,280 B2* | 6/2020 | Morris, III | C02F 5/12 |
| 2015/0216825 A1* | 8/2015 | Rimer | A61K 31/194 |
| | | | 514/574 |
| 2015/0297545 A1* | 10/2015 | Rimer | C07C 59/245 |
| | | | 514/574 |
| 2016/0176735 A1* | 6/2016 | Balasubramanian | C02F 5/10 |
| | | | 210/729 |

OTHER PUBLICATIONS

Suppressing Barium Sulfate Crystallization with Hydroxycitrate: A Dual Nucleation and Growth Inhibitor, Sosa et al., Chem. Mater. 2021, 33, 6997-7007.*
Crystallization and Dissolution Studies of Calcium Oxalate Monohydrate: a Microfluidic Approach, Magata Nkuba, May 2018.*

* cited by examiner

*Primary Examiner* — Haidung D Nguyen
(74) *Attorney, Agent, or Firm* — Jackson Walker LLP

(57) ABSTRACT

Analogues of citrate, namely hydroxycitrate (HCA) and isocitrate (ICA), have dual roles as nucleation inhibitors and growth suppressors in the formation of mineral scale. Their potency is comparable to commercial phosphorous-based inhibitors, but they are more environmentally friendly, which has practical advantages for use in a broad range of commercial applications.

20 Claims, 5 Drawing Sheets

DUAL NUCLEATION AND GROWTH INHIBITORS OF MINERAL SCALE

This application claims priority to U.S. Provisional Patent Application No. 63/228,391, entitled "Dual Nucleation and Growth Inhibitors of Mineral Scale," filed Aug. 2, 2021, the entire contents of which are hereby incorporated by reference.

BACKGROUND

This disclosure pertains to compounds that are useful for the inhibition of mineral scale.

Crystallization is a ubiquitous phenomenon in natural, biological, and synthetic processes that poses significant problems for pathological or infectious human diseases and scale formation in industrial pipelines and wellbores. Crystallization of mineral scale components ubiquitously plagues industrial systems for water treatment, energy production, and manufacturing. Research efforts to curtail the deleterious effects of mineral precipitation are focused on the development of economic, facile routes to inhibit crystallization. Phosphate-based scale inhibitors such as diethylenetriamine penta(methylene phosphonic acid) (DETPMP) are often employed to control mineral scale formation. Despite its high potency, the environmental drawbacks prompt scientific and industrial communities to pursue high performance low-cost and eco-friendly chemicals to address scale formation.

One of the most common methods of controlling crystallization is the use of molecular modifiers, which either promote or inhibit rates of crystal nucleation and/or growth. Nucleation of a crystalline phase is a stochastic process that relies primarily on the supersaturation of the parent solution. Foreign additives can be introduced into growth media as a means of inhibiting crystal nucleation via sequestration of solutes (i.e. reducing supersaturation), disrupting the formation of a critical nucleus (within the context of classical nucleation theory), or altering self-assembly of clusters that participate in nonclassical mechanisms of crystallization. Most common industrial modifiers of nucleation of barite and other scale are rich in phosphonate moieties (e.g. hydroxyethylidene diphosphonic acid or diethylenetriamine penta(methylene phosphonic acid)). Most of these commercial compounds are not readily biodegradable. Moreover, it is difficult to identify (macro)molecules that function as dual inhibitors of crystal growth and nucleation. Commercial scale dissolvers or inhibitors of mineral crystallization are insufficient to handle some of the most severe cases (e.g. barite).

SUMMARY

The present disclosure relates generally to compounds and additives that inhibit the formation of mineral scale in a variety of settings. In particular, the present disclosure relates to the use of citrate analogues, namely hydroxycitrate (HCA) and isocitrate (ICA), to suppress mineral scale through the inhibition of both nucleation and growth of crystals.

Crystal growth modifiers are capable of altering the morphology, size, and/or structure of crystals, often through preferential interaction with different crystallographic facets. Modifiers are typically decorated with functional groups (motifs) that have a strong binding affinity to crystal surface sites (kinks, step edges, or terraces) where they impede solute attachment via distinct modes of action that alter anisotropic rates of growth with concomitant impact on crystal shape. Citric acid (CA) is a common modifier of numerous minerals, such as calcium oxalate monohydrate and calcium carbonate, and is an active component in formulations used to prevent pipe corrosion. Citrate is commonly blended with chelating agents and surfactants as formulations to address pipeline scale problems. The use of citrate as a scale inhibitor has been demonstrated for $CaCO_3$ and $CaSO_4$. However, for less soluble minerals, such as $BaSO_4$ (barite), the efficacy of citrate is often limited due to its moderate interactions with barite crystal surfaces. Barium sulfate (barite) is a persistent inorganic scale component of sparing solubility that forms during energy production. Alternative molecules are needed that function as crystallization inhibitors (resulting from modifier-crystal interactions) and/or sequestering agents that have a binding affinity for free $Ba^{2+}$ cations.

Hydroxycitrate (HCA) and isocitrate (ICA), tri-carboxylate derivatives of citrate, are molecules possessing multiple carboxylates and multiple hydroxyl groups, which facilitate their interactions with mineral surfaces and free cations in solution. Unique properties of HCA and ICA are their ability to inhibit both nucleation and growth of crystals. Few inhibitors of mineral scale have the ability to suppress nucleation in addition to growth. Prior studies rarely decouple the contributions of molecular inhibitors during the early nucleation stage from that of later growth stages. A unique aspect of HCA is its ability to alter the structure of mineral surfaces, thus impeding regenerative growth (i.e., irreversible inhibition). HCA is a natural supplement (inexpensive and green inhibitor) that is available in bulk.

DETAILED DESCRIPTION OF PREFERRED EMBODIMENTS

The present disclosure relates to the use of citrate analogues, namely hydroxycitrate (HCA) and isocitrate (ICA), to suppress the formation of mineral scale.

Figure 1:
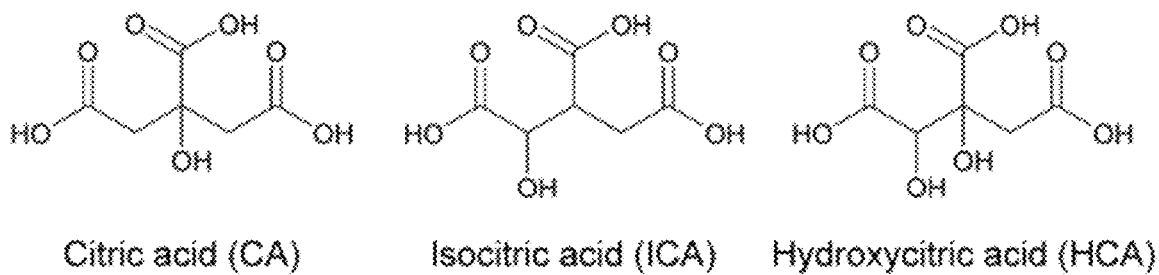
FIG. 1 shows (A) Chemical structures of citrate (CA), isocitrate (ICA), and hydroxycitrate (HCA), (B-D) SEM images of representative barite crystals synthesized in the presence of 3 µM CA, 3 µM ICA, and 0.3 µM HCA, and (E) Percent inhibition of barite crystallization as a function of supersaturation ratio in the presence of CA (left), ICA (middle), and HCA (right) at concentrations of 1, 5, and 10 µM, respectively.
Figure 1:
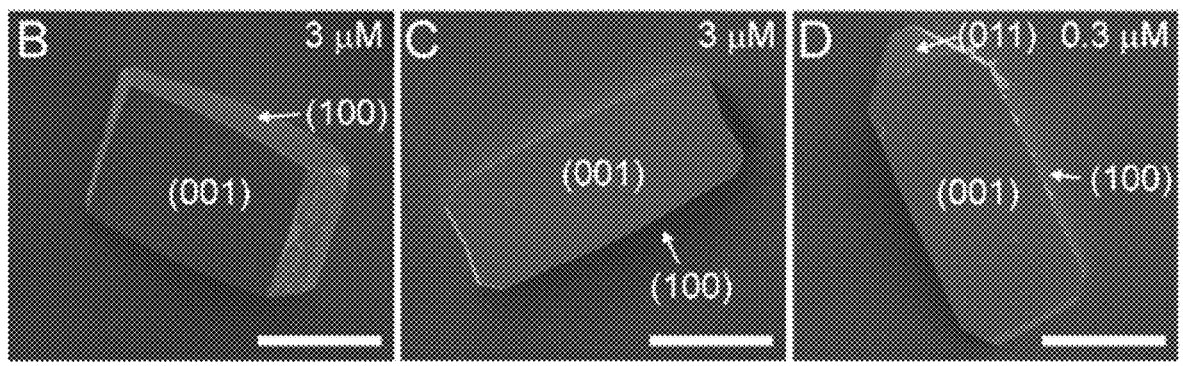
Figure 1:
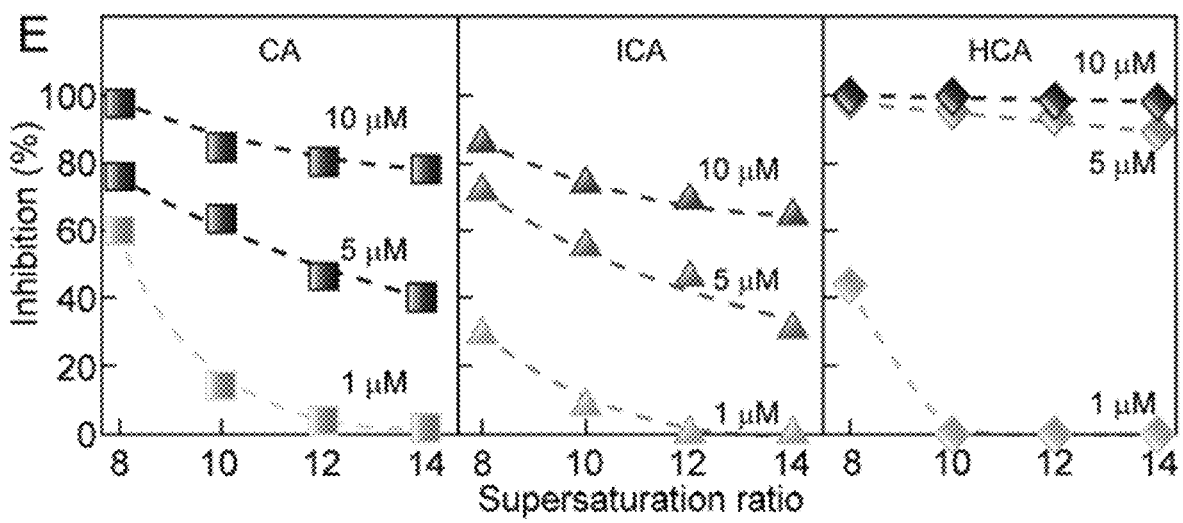

FIG. 1A shows the chemical structures of citrate (CA), isocitrate (ICA), and hydroxycitrate (HCA).

A unique mechanism for surface inhibition has been identified whereby an appreciable concentration of citrate analogue leads to the formation of a surface layer that blocks growth and prevents facile regrowth in the absence of the inhibitor. The efficacy of these molecules were evaluated by a combination of techniques that included bulk crystallization assays, kinetic studies of crystal growth (i.e. conductivity measurements and microfluidic assays), and atomic force microscopy to measure surface growth in real time. Collectively, these measurements reveal that HCA and ICA reduce the number of nuclei with increasing inhibitor concentrations, leading to the complete suppression of crystallization at threshold concentrations. Studies of crystal growth in the presence of HCA and ICA also reveal that the rate of growth is suppressed in the presence of both inhibitors. Studies revealed the ability of these growth inhibitors to suppress the advancement of facets, leading to complete arrest of growth at sufficient inhibitor concentrations.

Exposure of barite crystal surfaces to hydroxycitrate (HCA) results in changes to the crystal interface that persist after removal of the modifier. Attempts to regenerate growth of barite crystals in modifier-free superstaturated media result in long periods without noticeable growth. When growth does occur, the rate is much less than that observed for crystals that have not been exposed to the modifier, indicating a sustained growth inhibition that persists well after the removal of the modifier. This enables growth inhibition to be achieved without continual exposure of mineral scale to the modifier.

It is well established that conventional molecular inhibitors tend to adsorb onto the active sites, e.g. kinks and steps of the crystal surface, to constrain the step movement as well as block the surface diffusion of the solute molecules. The introduction of growth solution containing HCA favors the rapid formation of islands on the (001) basal surface, thereby resulting in a highly roughened interface. This process results in the deceleration of crystal growth and the complete arresting of layers. The newly formed rough layer consists of a large number of defects (potentially amorphous deposits) that frustrate the attachment of solutes, thereby hindering the growth of barite surfaces. Attempts to regenerate growth by the addition of supersaturated solutions in the absence of HCA were unsuccessful, indicating an irreversible inhibition of growth that is not commonly observed in reported examples of crystal growth inhibitors. Thus, growth inhibition is maintained after the initial exposure to HCA without the need to supply modifier on a continual basis.

A cooperative approach was used to investigate barite crystallization and inhibition pathways across a set of citrate analogues using bulk crystallization assays, microfluidics, and atomic force microscopy (AFM). Through time-resolved microfluidic assays it was shown that preferred examples of citrate analogues preferentially bind to barite (010) and (100) facets. Using oblique illumination microscopy (OIM), barite nucleation events were investigated and a decrease in barium sulfate particles was observed in the presence of 1 mM HCA, suggesting that the citrate analogues act as a potent barite nucleation inhibitor. Finally, in situ AFM studies over a 12-h period of regeneration after exposing (001) surfaces to a citrate analogue reveal a unique mechanism of sustained (or irreversible) barite surface growth inhibition. Together, these studies identify these naturally derived molecules as dual inhibitors of barite nucleation and growth.

From a manufacturing standpoint, the citrate analogues can be easily extracted from the natural plant such as *Garcinia cambogia* which ensures its commercial viability as a potential antiscalant. Lastly, HCA has been suggested as one of the important ingredients of the over-the-counter supplements for weight control. This implies that the use and disposal of HCA-based chemicals will not cause hazardous consequence to the environment and human body which is beneficial for the development and marketing of HCA relevant products.

The combination of HCA with other organic compounds may potentially result in synergistic cooperativity that could further enhance its efficacy. HCA and ICA could be used as inhibitors of other mineral scales based on their proven performance as inhibitors of calcium oxalate monohydrate (COM), magnesium ammonium phosphate (struvite), and calcium phosphate (brushite).

Preferred embodiments described herein relate to compositions and methods for irreversible inhibition of mineral accumulation on surfaces such as pipelines. Preferred methods involve the use of a small quantity of HCA in fluid streams (oil, gas, water) as a preventative measure to slow the nucleation, growth, and long-term accumulation of minerals in pipelines. The mechanism of action works by HCA adsorption with mineral solute to prevent nucleation or by adsorbing on the surfaces of crystals to prevent growth. Only a small concentration of HCA is necessary to completely block mineral growth. A combination of high-resolution techniques has shown that HCA interaction with mineral surfaces alters their structure (e.g. deposition of an amorphous layer) that leads to sustained inhibition during regeneration tests where minerals are placed in contact with fresh (HCA-free) solutions. Under these conditions, growth inhibition is maintained for an extended period of time. Irreversible inhibition indicates that HCA does not have to be present continuously for its effective use, which would cut down on operating costs.

Preferred embodiments of mineral scale inhibitor compositions described herein include hydroxycitrate (HCA), which functions as both a nucleation and growth inhibitor at relatively low concentrations (2 µM). The compositions described herein are unique inhibitors of scale formation that alter the surface of crystals to impede their regenerative growth. Hydroxycitrate possesses the unique ability to bind to all principal faces of barite crystals to completely suppress crystal growth.

Preferred embodiments disclosed herein include a method for inhibiting the formation of mineral scale in a system, where the system comprises surfaces in contact with a liquid. The method includes a step of adding an amount of inhibitor to the liquid in the system, wherein the inhibitor comprises hydroxycitrate, and wherein the inhibitor is present in the liquid at a concentration of 250 nM to 10 µM, to inhibit or suppress the formation of mineral scale on the surfaces. Preferred embodiments of the method also include a step of maintaining the inhibitor in the system for a short period of exposure time. The short period of exposure time may be less than ten minutes. Additional preferred embodiments of the method include the step of removing the inhibitor from the liquid in the system for a further period of time, whereby the formation of mineral scale on the surfaces in the system remains irreversibly inhibited or suppressed. This is a notable and distinctive feature of the present disclosure, as the irreversible inhibition of the formation of mineral scale even after removal of the inhibitor is unexpected in view of what is understood about the formation of mineral scale.

Preferred embodiments of the method may also include the step of adding an additional amount of inhibitor to the system for an additional short period of time, whereby the formation of mineral scale on the surfaces in the system remains irreversibly inhibited or suppressed. The inhibitor may be present in the liquid at a concentration of 1 µM to 5 µM, or preferably at a concentration of 2 µM. In preferred embodiments the liquid is water. The system may be a water treatment, energy production, or manufacturing system. The inhibitor may further comprise one or more of isocitrate (ICA) and citric acid (CA).

Further preferred embodiments described herein include a method for inhibiting the formation of mineral scale in a system, where the system comprises surfaces in contact with a liquid, by depositing a layer of hydroxycitrate on the surfaces in contact with the liquid by adding an amount of hydroxycitrate to the liquid in the system. The hydroxycitrate may be present in the liquid at a concentration of 250 nM to 10 µM and will inhibit or suppress the formation of mineral scale on the surfaces. The hydroxycitrate may also preferably be present in the liquid at a concentration of 1 µM to 5 µM. The liquid may be water and the system may be a water treatment, energy production, or manufacturing system.

Additional preferred embodiments disclosed herein include a formulation for inhibiting the formation of mineral scale in a system, where the system comprises surfaces in contact with a liquid. The formulation preferably includes one or more portions of hydroxycitrate for addition to the liquid in the system. Adding a portion of hydroxycitrate to the liquid in the system preferably results in a concentration of 250 nM to 10 µM of hydroxycitrate in the liquid, and may preferably result in a concentration of 1 µM to 5 µM of hydroxycitrate in the liquid. The liquid may be water and the system may be a water treatment, energy production, or manufacturing system. In certain preferred embodiments, the formulation comprises more than one portion of hydroxycitrate for intermittent addition to the liquid in the system. The formulation may also further comprise one or more of isocitrate (ICA) and citric acid (CA)

Example 1

Materials. The following reagents were purchased from Sigma Aldrich: sodium hydroxide (>97%), barium chloride dihydrate (99+%), sodium sulfate (>99%), and sodium chloride (>99.5%), sodium citrate tribasic dihydrate (≥99.0%), DL-isocitric acid disodium hydrate (93%), potassium hydroxycitrate tribasic monohydrate (≥95%), sodium hydroxide (>97%), hydrochloric acid (37%). Polydimethylsiloxane (PDMS, Dow Corning SYLGARD 184) was purchased from Essex Brownell. SU-8 2150 photoresist and SU-8 developer were purchased from Kayaku. All chemicals were used as received without further purification. Silicone tubing was purchased from Cole-Parmer. Deionized (DI) water (18.2 MΩ·cm) filtered with an Aqua Solutions RODI-C-12A purification system was used in all experiments.

Materials Characterization and Instrumentation. Dual star benchtop pH/ISE meters (Orion) equipped with a ROSS Ultra electrode (8102BNUWP) was used for adjusting pH as well as monitoring pH change during crystallization. Speciation curves were plotted using Hyperquad Simulation and Speciation (HySS2009), with $pk_a$ values obtained from literature. For ex situ microscopy measurements, a clean glass slide (0.5×0.5 cm$^2$) was placed at the bottom of the glass vials to collect barite crystals. After crystallization, the glass slide was removed from its solution, thoroughly rinsed with DI water, and dried in air prior to further analysis. Scanning electron microscope (SEM) samples were prepared by attaching carbon tape to SEM studs and subsequently attaching glass slides to carbon tape by gently pressing the glass slide to the tape using tweezers. Scanning electron microscope (SEM) images were obtained on a FEI 235 dual-beam (focused ion-beam) system operated at an accelerating voltage of 15 kV and a working distance of 5 mm. As-synthesized samples were prepared by gently pressing the glass slide containing crystals onto the carbon tape. All samples were coated with a thin layer of gold (ca. 5-10 nm) prior to imaging to minimize charging.

The morphology and size of barite crystals were characterized using a Leica DM2500-M optical microscope in transmittance mode, whereas in situ imaging of crystal growth in the microchannels was performed on the Leica DMi8 inverted optical microscope using transmittance mode equipped with HC PL Fluotar 5×, 10×, 20×, and N Plan L 50× objectives. At least fifteen brightfield images of representative areas on the bottom of the glass vials were captured in transmittance mode for characterization of crystals grown in the bulk assay. The average [010] length, [100] width, and [001] thickness of barite crystals in optical micrographs were measured from at least 100 crystals per trial and three separate trials. For in situ time-resolved studies, LAS X software was used to program a minimum of 30 positions along a seeded microchannel, at which images were captured in transmittance mode at 5 min intervals for at least 3 h. Crystals observed in situ were analyzed using ImageJ (NIH) using a procedure previously reported. At least 90 crystals located in different channels per batch were analyzed at 5 min intervals over a minimum of 3 h. Crystal lengths were measured every 5 min during inhibition studies. From the change in crystal length over time, a growth rate r was determined for each experimental condition, which can be written as percent inhibition using the relative growth rate described previously.

Bulk Crystallization Assays. Bulk crystallization assays were performed in the presence and absence of each modifier using optical and electron microscopy to evaluate changes in crystal size, morphology, and population, and solution conductivity measurements were used to assess crystallization kinetics. For all studies reported herein, solution pH of the growth medium was adjusted to 7.1±0.3 to evaluate the effects of CA, ICA, and HCA in their fully deprotonated states on barite crystallization. Barite crystals were synthesized using a protocol established in previous work. Briefly, aliquots of 10 mM $BaCl_{2,(aq)}$ and 10 mM $Na_2SO_{4,(aq)}$ stock solutions were added into a 20-mL glass vial containing $NaCl_{(aq)}$ under mild agitation for 10 s. Samples prepared in the presence of inhibitors were synthesized by adding aliquots of aqueous stock solutions of inhibitors to the synthesis mixture prior to addition of $Na_2SO_4$. The reaction mixture produced growth solutions with a total volume of 10 mL, a pH of 7.1±0.3, and a composition of 0.5 mM $BaCl_2$:0.5 mM $Na_2SO_4$:600 mM NaCl:x μM modifier (0≤x≤5). The sample vials were left undisturbed at 21±1° C. for 24 h to allow crystallization of hexagonal coffin-shaped barite crystals exhibiting prominent (001), (210), and (100) facets. Natural barite samples were obtained from Amazon and purity was determined in previous work. Optical micrographs of glass slides placed at the bottom of crystallization vials were analyzed after 24 h under quiescent conditions to assess the number density of crystals. Bulk crystallization assays were conducted under quiescent conditions using growth solutions with a supersaturation ratio of 10. Scale bars equal 20 μm. The findings revealed that CA had no observable effect on crystal number density relative to the control (i.e. absence of modifier), whereas a monotonic reduction in barite crystal number density was observed with increasing ICA concentration. In contrast, a sharp decline in crystal number density was observed for solutions containing HCA at concentrations above 1.2 μM, which indicates that HCA impedes barite nucleation.

FIG. 1B-1D show scanning electron microscopy (SEM) images of representative barite crystals synthesized in the presence of 3 μM CA, 3 μM ICA, and 0.3 μM HCA. SEM images revealed distinct changes in barite crystal morphology with each polyprotic acid. CA produces a barite morphology with a reduced length [010] to width [100] aspect ratio compared with that of the control, suggesting a preferential binding that influences growth along the [010] direction. In media containing ICA, growth is also frustrated along the [010] direction to yield a distinct crystal habit. Bulk assays in solutions containing HCA required significantly less modifier to inhibit crystal growth, and also resulted in the generation of two uncommon crystal facets: (011) and (010) faces. The ability of all three modifiers to impart different crystal morphologies is indicative of their unique binding specificities to barite crystal surfaces, consistent with prior studies showing the unique effects of these homologous polyprotic acids as modifiers of other minerals.

Barite Crystallization Kinetics in Bulk Assays. Ionic conductivity has proven to be an effective method of screening the efficacy of crystal growth modifiers by measuring the overall kinetics of crystallization without distinguishing between nucleation and growth. Monotonic reduction in conductivity during the course of crystallization allows for the quantification of desupersaturation rate (i.e. a surrogate for the kinetic rate of crystallization) in the presence and absence of modifiers. Conductivity measurements were carried out to assess the crystallization kinetics in the absence and presence of inhibitors under stirred conditions (300 rpm). The experiments were performed over a range of barium sulfate supersaturation (supersaturation ratio S=8-14) to assess the degree to which each modifier inhibits solute depletion over time (reported as a percent inhibition relative to the control). The conductivity cell (Thermo Scientific Orion DuraProbe) was vertically immersed into the growth solution and the readings were recorded by a conductivity meter (Thermo Scientific Orion Star A112 benchtop conductivity meter). The conductivity probe was calibrated with Orion conductivity standard 100 prior to each experiment. A linear fit was performed on the initial linear portion (30 min) of conductivity values over time, which represents the rate of solute consumption (i.e. crystallization) and is representative of the rate of crystallization (i.e. both nucleation and growth). Percent inhibition was calculated as % Inhibition=(1−RGR)×100%, where RGR represents the relative growth rate, defined as the growth rate in the presence of inhibitors divided by the growth rate in the absence of inhibitors. FIG. 1E shows percent inhibition of barite crystallization as a function of supersaturation ratio in the presence of CA (left), ICA (middle), and HCA (right) at concentrations of 1, 5, and 10 μM, respectively. The percent inhibition was extracted from time-resolved measurements of solution conductivity under continuous stirring. Symbols are the average of at least three separate experiments. Error bars span two standard deviations (those not visible are smaller than the size of the symbols).

The percent inhibition of barite growth for all modifiers generally decreases with increasing supersaturation ratio as shown in FIG. 1E, and increasing inhibitor concentration at fixed supersaturation enhances inhibition. Trends in percent inhibition as a function of supersaturation are nearly identical at 1 μM concentrations of citrate analogues. At concentrations of 5 μM, however, it was observed that HCA became a significantly more potent crystallization inhibitor. Another unique characteristic of HCA is its ability to completely suppress barite crystallization over the entire range of supersaturation compared to CA and ICA, neither of which exceed 80% inhibition at the highest supersaturation tested.

Example 2

In Situ Microfluidic Assays. A previously developed microfluidic platform was used to investigate the effects of CA, ICA, and HCA on the macroscopic rates of barite growth in all three principal crystallographic directions. The microfluidic platform used was adapted from previous work, in which a chip featuring individual straight channels houses barite seed crystals. To generate barite seeds, microchannels were treated with a growth solution at a high enough supersaturation (S=10) to nucleate crystals inside the channels. Microchannels were then flushed thoroughly with 10 mL of DI water at a rate of 120 mL h$^{-1}$ to ensure proper adhesion between seed crystals and the microfluidic device substrate. To grow barite crystals without additional nucleation, a growth solution with lower supersaturation (S=7) was delivered into the microchannels using a dual syringe pump (CHEMYX Fusion 200) at a rate of 12 mL h$^{-1}$ for 90 min. For growth, two solution components were prepared in individual syringes. One solution contained 0.5 mM $BaCl_2$ $_{(aq)}$, and the second solution contained 0.5 mM $Na_2SO_4$ and 1.2 M NaCl. The two solutions were mixed using an inline flow configuration to produce a final composition of 0.35 mM $BaCl_2$, 0.35 mM $Na_2SO_4$, and 600 mM NaCl. Inhibition studies required the use of two dual syringe pumps, each containing syringes of the same growth solution composition but different quantities of growth modifiers. Time-resolved imaging of barite crystal growth and inhibition using an inverted optical microscope was performed to quantify the kinetics of barite crystallization.

Figure 2:
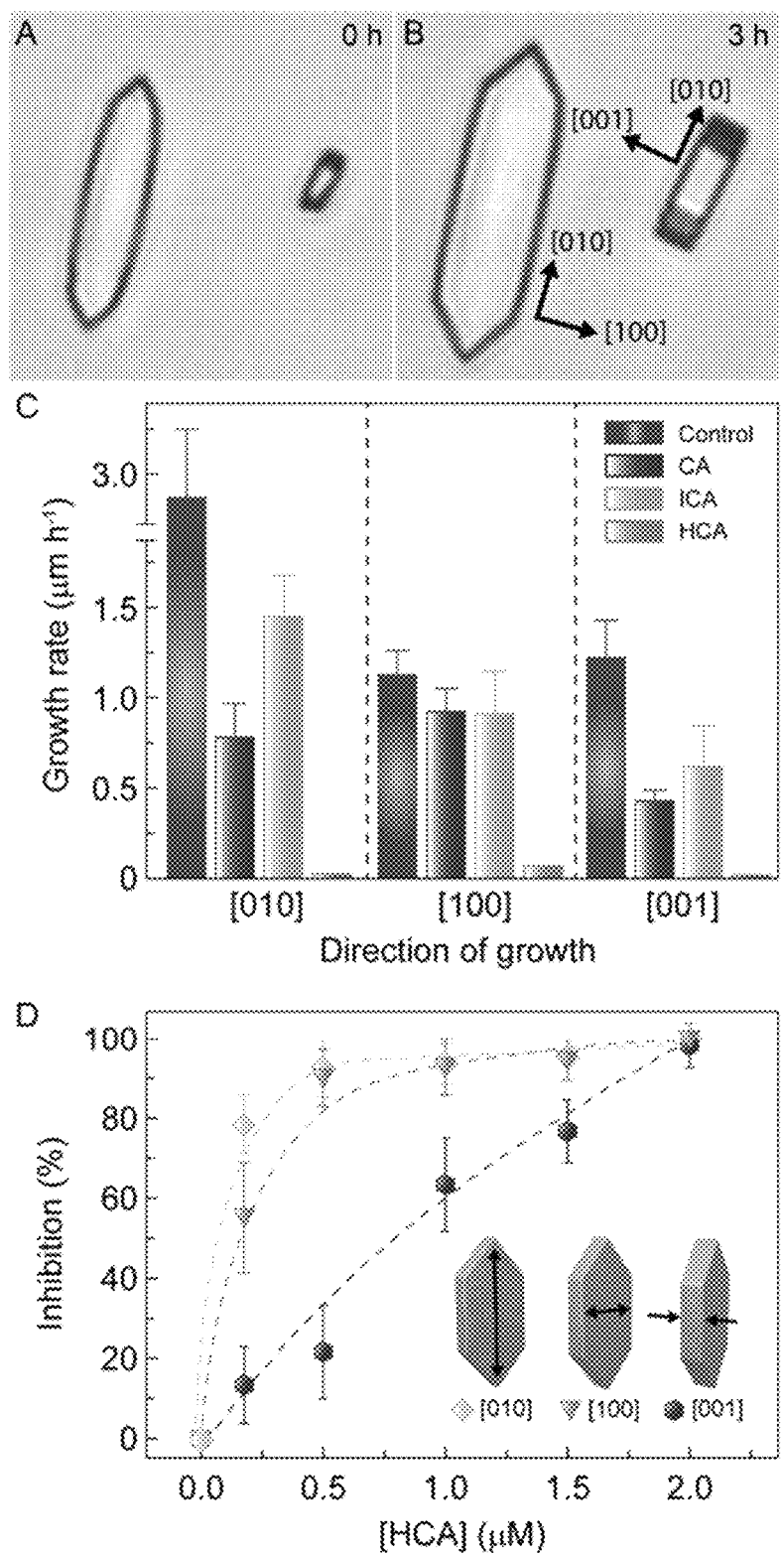
FIG. 2 shows (A-B) optical micrographs of barite crystals in a microchannel growing under constant flow (12 mL h$^{-1}$) of supersaturated solutions (supersaturation ratio, S=7) at times 0 h and 3 h, respectively, (C) growth rate of barite crystals for all three principal crystallographic directions in the absence and presence of 5 µM CA, ICA, and HCA, and (D) percent inhibition of barite growth in each crystallographic direction obtained from microfluidic assays at different HCA concentrations.

In these experiments, growth solutions were supplied at a constant flow rate to maintain a fixed supersaturation under kinetically-controlled growth conditions. Optical micrographs were taken at periodic time intervals capture the growth of individual barite crystals, wherein it is possible to measure changes in crystal length, width, and thickness owing to orthogonal orientations of seed crystals deposited within the microchannel. FIGS. 2A and 2B show optical micrographs of barite crystals in a microchannel growing under constant flow (12 mL h$^{-1}$) of supersaturated solutions (supersaturation ratio S=7) extracted from a movie at times 0 h and 3 h, respectively. FIG. 2C shows the growth rate of barite crystals for all three principal crystallographic directions in the absence and presence of 5 µM CA, ICA, and HCA. Data are the average of at least 100 crystals from a single experiment. Error bars equal one standard deviation. In FIG. 2C the effects of each modifier on anisotropic rates of barite crystal growth were compared and note the following order of efficacy: HCA>CA≈ICA. In the presence of 5 µM CA a 75% reduction in growth rate along the crystal length (b direction) was observed, a 68% reduction of growth along the thickness (c direction), and virtually no inhibition along the width (a direction). These results are consistent with quiescent bulk assays showing CA binding specificity for the barite (010) surface. Microfluidic assays of growth solutions containing ICA reveal similar specificity, but lower efficacy (i.e growth inhibition of 50, 19, and 49% in length, width, and thickness, respectively). Analogous to quiescent bulk assays (FIG. 1E), solutions containing 5 µM of HCA result in nearly complete inhibition of all crystallographic directions; thus, studies conducted under both quiescent and flow conditions consistently show HCA to be a more potent growth inhibitor.

The specificity of HCA for barite crystal facets was more clearly differentiated by lowering modifier concentration below 2 µM. FIG. 2D shows percent inhibition of barite growth in each crystallographic direction obtained from microfluidic assays at different HCA concentrations. The inset shows illustrations of barite crystals with indexed length, width, and thickness. Symbols are the average of at least 100 crystals in a single experiment. Error bars span two standard deviations. Dashed lines are interpolated to guide the eye. Under these conditions, it was observed that HCA preferentially impedes growth along the [010] and [100] directions with complete suppression occurring around 0.5 µM HCA. By contrast, HCA's impact on barite growth along the [001] direction is less effective. Indeed, this study reveals that a four-fold higher concentration of HCA is required to completely suppress growth along the [001] direction. To this end, these results demonstrate that HCA preferentially interacts with barite (010) and (100) surfaces.

Example 3

Hydroxycitrate as a barite nucleation inhibitor. Having identified HCA as a potent inhibitor of barite growth, bulk crystallization assays were expanded to systematically assess the effects of HCA on barite nucleation. The onset of nucleation and aggregation of particles was characterized by using Nanosight LM10-HS oblique illumination microscopy (OIM) equipped with a green laser (532 nm), which illuminates a thin film of solution at an oblique angle. This method relies on light scattered at wavevectors of order µm$^{-1}$ and probes length scales in the range 10$^{-3}$ to 10 µm. 1 mL samples of supersaturated solution (supersaturation ratio S=10) in the absence and presence of inhibitors were injected into the OIM chamber, creating a film of thickness 500 µm between two glass substrates, and incubated for varying times at room temperature 21±1° C. The average number density of the particles was determined through OIM analysis. A minimum of 10 regions within the liquid film were recorded and at least 50 particles were analyzed to obtain the particle number density for each inhibitor concentration.

OIM measurements were conducted under quiescent conditions to track the Brownian motion of particles suspended in liquid. For these studies supersaturated solutions of barium sulfate were compared in the absence and presence of HCA (at fixed supersaturation ratio S=10). In solutions without modifier, 65±6 particles µm$^{-2}$ were measured immediately after mixing all components and injecting the sample into the OIM chamber. This observation is consistent with conductivity measurements where there is an immediate reduction in the ion concentration upon mixing of reagents, which suggests an initial period of rapid precipitation.

Figure 3:
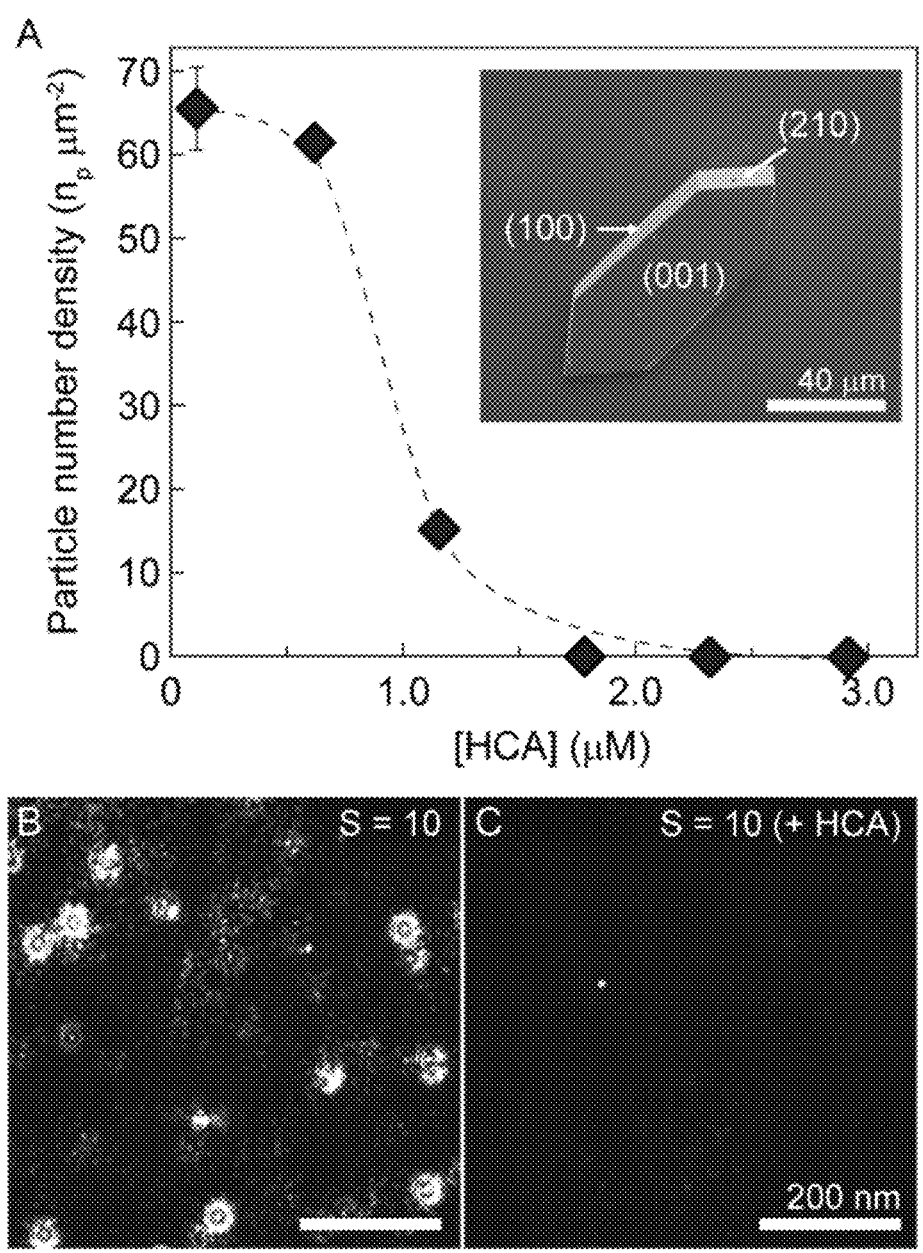
FIG. 3 shows (A) number density of barite particles decreasing as a function of HCA concentration in oblique illumination microscopy (OIM) assays, and (B-C) OIM images of a supersaturated barium sulfate solution (S=10) in a liquid sample chamber at 21±1° C. in media (B) without modifier and (C) in the presence of 3 µM HCA.

In the presence of HCA, OIM measurements revealed a monotonic reduction in particle number density with increasing HCA concentration. FIG. 3A shows number density of barite particles decreasing as a function of HCA concentration in oblique illumination microscopy (OIM) assays. The dashed line is interpolated to guide the eye. The inset shows scanning electron micrograph of an unmodified barite crystal displaying three principal facets: (001), (210), and (100). In supersaturated growth solutions containing HCA at concentrations ≥1.75 µM, particles were not observed in the OIM sample chamber, which indicates that HCA functions as an inhibitor of nucleation. Still frame images from time-resolved OIM measurements revealed that a supersaturated solution (supersaturation ratio S=10) in the absence of HCA contains large (mostly immobile) particles that have precipitated to the bottom of the sample chamber. FIGS. 3B and 3C show OIM images of a supersaturated barium sulfate solution (supersaturation ratio S=10) in a liquid sample chamber at 21±1° C. These images were extracted after 30 min of solution preparation from movies corresponding to media (FIG. 3B) without modifier and (FIG. 3C) in the presence of 3 µM HCA. The solution with 3 µM HCA contained only trace particles, consistent with bulk crystallization assays showing the absence of crystals after 24 h.

OIM measurements of barium sulfate solutions at thermodynamic equilibrium (i.e. solubility) or at concentrations below saturation both show no evidence of particles or clusters with sizes that fall within the detection limit of the instrument (≥20 nm). As such, there is no evidence to suggest that barite nucleation involves a nonclassical two-step mechanism, but rather appears to abide by classical nucleation theory. Interestingly, nucleation can be fully suppressed using only a small quantity of HCA (i.e. 1 mol HCA: 250 mol Ba$^{2+}$). Using a reported potentiometric titration method in the literature to assess ion chelation, there is no appreciable sequestration of free Ba$^{2+}$ ions in solution by HCA. This suggests that HCA suppresses barite crystallization not by sequestering solute ions, but through processes that disrupt the formation of a critical nucleus.

Example 4

Microscopic Assessment of Barite Growth Inhibition. In situ atomic force microscopy (AFM) has proven to be a valuable technique for probing the dynamics of surface growth and its inhibition at near molecular level. In situ AFM was used to compare the modes of action of CA, ICA, and HCA as inhibitors of barite surface growth, focusing on the temporal changes in topographical features on the (001) surface of barite. An AFM specimen disk (Ted Pella) covered with a thin layer of thermally curable epoxy (Loctite, China) was placed at the bottom of glass vials during barite synthesis in the bulk assay procedure outlined above. The epoxy was first partially cured in an oven for approximately 6 min at 60° C. and then dried in air overnight for complete curing. All AFM measurements were performed in a Cypher ES instrument (Asylum Research, Santa Barbara, CA) using silicon nitride probes with a spring constant of 0.08 N m$^{-1}$ (Oxford Instruments, PNP-TR 1). The liquid cell (ES-CELL-GAS) contained two ports for inlet and outlet flow to maintain constant supersaturation during AFM measurements. Several concentrations of citrate (CA), isocitrate (ICA), and hydroxycitrate (HCA) ranging from 1-10 μM were tested in growth solutions with supersaturation ratio S=5.3. A supersaturation (S=5.3) was selected within a range previously shown to promote surface growth via 2-dimensional birth and spreading. The growth solution was delivered to the liquid cell using an in-line mixing configuration in which the two solute solutions ($Ba^{2+}$ and $SO_4^{2-}$) were combined immediately before being introduced into the cell (similar to the microfluidics configuration). Freshly prepared growth solutions were used for each experiment (within 2 hours of their preparation). Continuous imaging was performed at ambient temperature in contact mode with a scan rate of 2.44 Hz and 9.77 Hz at 256 lines per scan. For extended time experiments (>4 hours), images were taken in contact mode at 30 min intervals. Relative step velocities were determined by measuring the temporal change in 2D island length in the [010] direction for a minimum of 50 2D islands in the presence of inhibitors (v) and in the absence of inhibitors ($v_o$).

Figure 4:
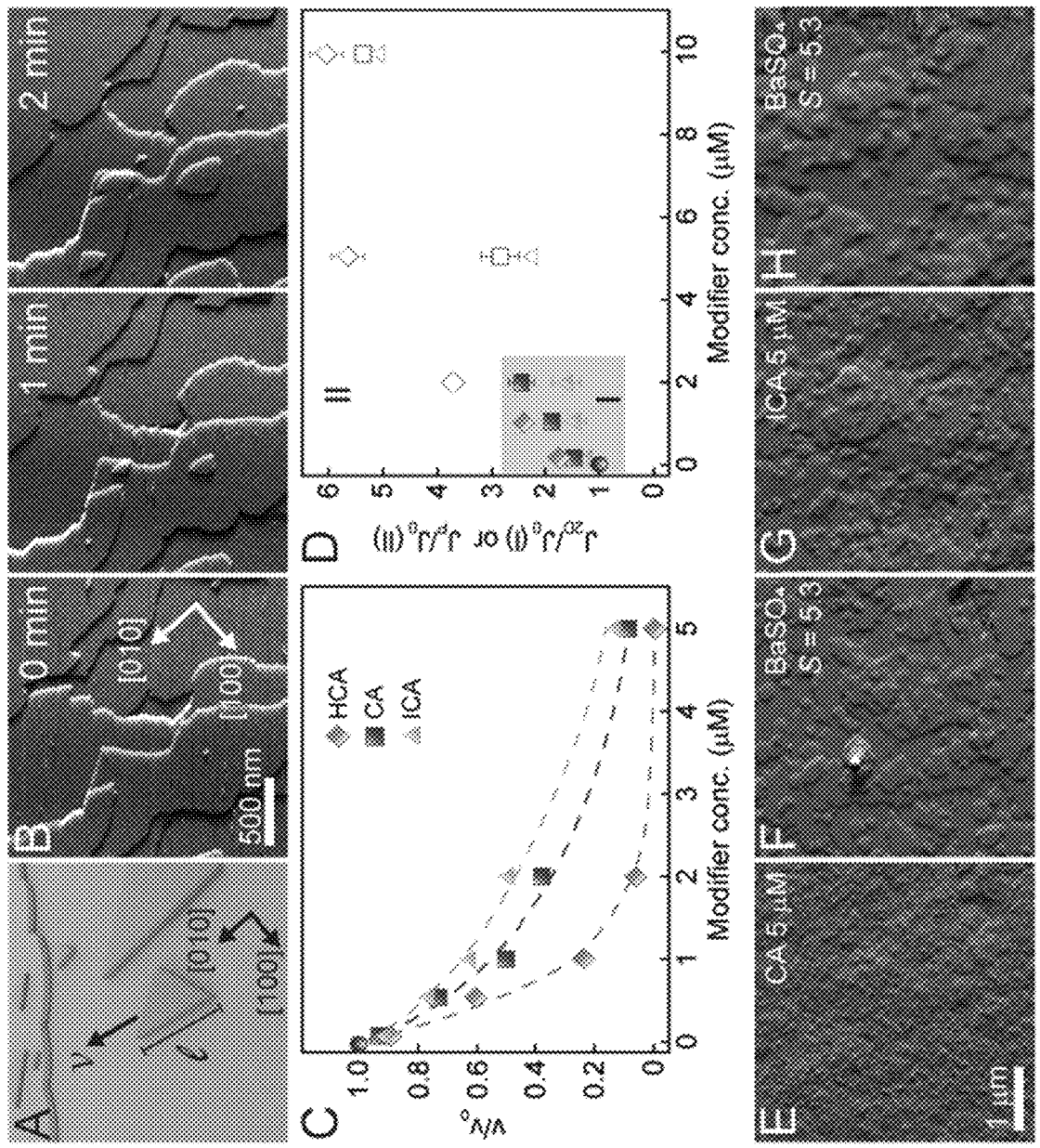
FIG. 4 shows (A) idealized schematic of 2D islands on the barite (001) surface illustrating the orientation and length (l) of island in the [010] direction that is measured over time to calculate step velocity (v), (B) time-resolved in situ atomic force microscopy (AFM) images of (001) surface growth under flow of pure barium sulfate growth solution at fixed supersaturation (supersaturation ratio S=5.3), (C) relative step velocity of layers on the (001) barite surface as a function of inhibitor concentration for the [010] direction of steps, (D) rate of 2D particle nucleation of new layers $J_{2D}$ relative to that in the absence of inhibitors $J_{2D,0}$ as a function of inhibitor concentration (filled symbols), (E) in situ AFM image of (001) barite surface growth suppression in the presence of 5 µM CA after 35 min, (F) the recovered surface after reintroducing pure barite growth solution after 55 additional min, (G) In situ AFM image of (001) barite surface growth suppression in the presence of 5 µM ICA after 35 min, and (H) the recovered surface after reintroducing pure barite growth solution after 55 additional min.

Each single layer has an average height of 3.6 Å (equivalent to a c/2 unit cell dimension) and a triangular morphology bound by [010] and [120] steps. FIG. 4A shows an idealized schematic of 2D islands on the barite (001) surface illustrating the orientation and length (l) of island in the [010] direction that is measured over time to calculate step velocity (v). FIG. 4B shows time-resolved in situ AFM images extracted from a movie of (001) surface growth under flow of pure barium sulfate growth solution at a supersaturation ration of 5.3. Step velocity in the direction was measured from sequential images during continuous scanning. A relative step velocity $v/v_o$ was reported where the velocity in the presence of each modifier, v, was scaled by the value in the absence of modifier, $v_o$. FIG. 4C shows relative step velocity of layers on the (001) barite surface as a function of inhibitor concentration for the [010] direction of steps. Dashed lines are interpolated to guide the eye show the reduction in step velocities owing to inhibitor adsorption on the (001) surface. Comparison of all three modifiers reveal a similar trend of decreasing relative step velocity with increasing modifier concentration. Among the molecules tested, HCA is more potent and results in complete suppression of step advancement above 2 μM HCA. Further analysis of the HCA step velocity profile reveals a linear scaling relation between $v_o(v_o-v)^{-1}$ and $c^{-1}$ (where c is the concentration of modifier), which is indicative of a kink blocking mechanism. The same analysis for CA and ICA revealed a superlinear scaling relation that seems to suggest a combination of two mechanisms, with the second likely to be that of step pinning (one of the most common mechanisms of surface growth inhibition).

Previous examples of kink blockers have shown that layered growth by continuous generation of kink sites at step edges leads to a plateau in the velocity profile (ca. 50% inhibition) with increasing modifier concentration whereby step advancement is not fully suppressed. This result seems to suggest that the mechanism(s) of growth inhibition for all three modifiers in FIG. 4C may not be exclusively a kink blocking or step pinning mode of action. To test this hypothesis, the rate of 2D island generation $J_{2D}$ (number of islands per surface area) was measured from time-resolved in situ AFM images. Based on reported trends for other crystal systems, it is expected that the rate of layer generation decreases with increasing modifier concentration owing to the ability of adsorbed modifiers on crystal surfaces to impede the formation of a critical 2D nucleus. The measurements, however, instead show the opposite trend for all three growth modifiers wherein adsorbed modifiers seemingly promote 2D island formation by a mechanism that remains elusive. FIG. 4D shows the rate of 2D particle nucleation of new layers $J_{2D}$ relative to that in the absence of inhibitors $J_{2D,0}$ as a function of inhibitor concentration (filled symbols). The light grey region denotes samples in which successive layers correspond to 2D nuclei. In region II, open symbols denote the relative rate of generation $J_P/J_o$ of surface protrusions with step heights significantly smaller than the barite unit cell dimension (c/2). The control in C and D is indicated by a grey circle. These results are reported as a relative 2D nucleation rate $J_{2D}/J_{2D,0}$ where measurements in the presence of modifier are scaled by the value in the absence of modifier ($J_{2D,0}$=1.24 μm$^{-2}$).

At modifier concentrations below 2 μM (FIG. 4D, filled symbols in shaded grey region I), the rate of 2D nucleation is up to 2.5-times greater than that of the control. Interestingly, concentrations above 2 μM (labelled region II in FIG. 4D) lead to further increases in the number of 2D features; however, there are several distinctions between the features observed in regions I and II. First, the 2D features observed in region II neither grow nor dissolve with imaging time. Second, the features in region II have much smaller heights compared to the height of a single step (3.6 Å) on the barite (001) surface. Although the exact structure of these features cannot be resolved with our measurements, we posit that they are disordered islands (i.e. amorphous or possessing high defect density). The deposition of smaller features increases with increasing modifier concentration. HCA produces the largest increase in the rate of appearance of surface protrusions, which we label $J_P$ (FIG. 4D, open symbols in region II) to distinguish this phenomenon from layer nucleation $J_{2D}$. Time-resolved in situ AFM reveals that the (001) surface becomes covered in small features, which suppresses layer advancement once concentrations reach 5 μM for CA and ICA. FIG. 4E shows an in situ AFM image of (001) barite surface growth suppression in the presence of 5 μM CA after 35 min and FIG. 4F shows the recovered surface after reintroducing pure barite growth solution after 55 additional min. FIG. 4G shows an in situ AFM image of (001) barite surface growth suppression in the presence of 5 μM ICA after 35 min and FIG. 4H shows the recovered surface after reintroducing pure barite growth solution after 55 additional minutes.

Experiments were performed to assess potential regeneration of layered growth upon removal of the modifier and reintroduction of fresh (modifier-free) supersaturated growth solution (supersaturation ratio S=5.3) to the AFM liquid cell. Time-resolved images of barite (001) surfaces reveal that layered growth is recovered to its original value within one hour for surfaces that had been exposed to CA (FIG. 4F) and ICA (FIG. 4H); thus, the effects of CA and ICA on barite growth are reversible. In contrast, regeneration of surfaces exposed to 5 µM HCA did not recover rates of layered growth to their original values (i.e. before exposure to HCA) even after 10 hours of intermittent AFM imaging, highlighting a mechanism of irreversible growth inhibition.

Figure 5:
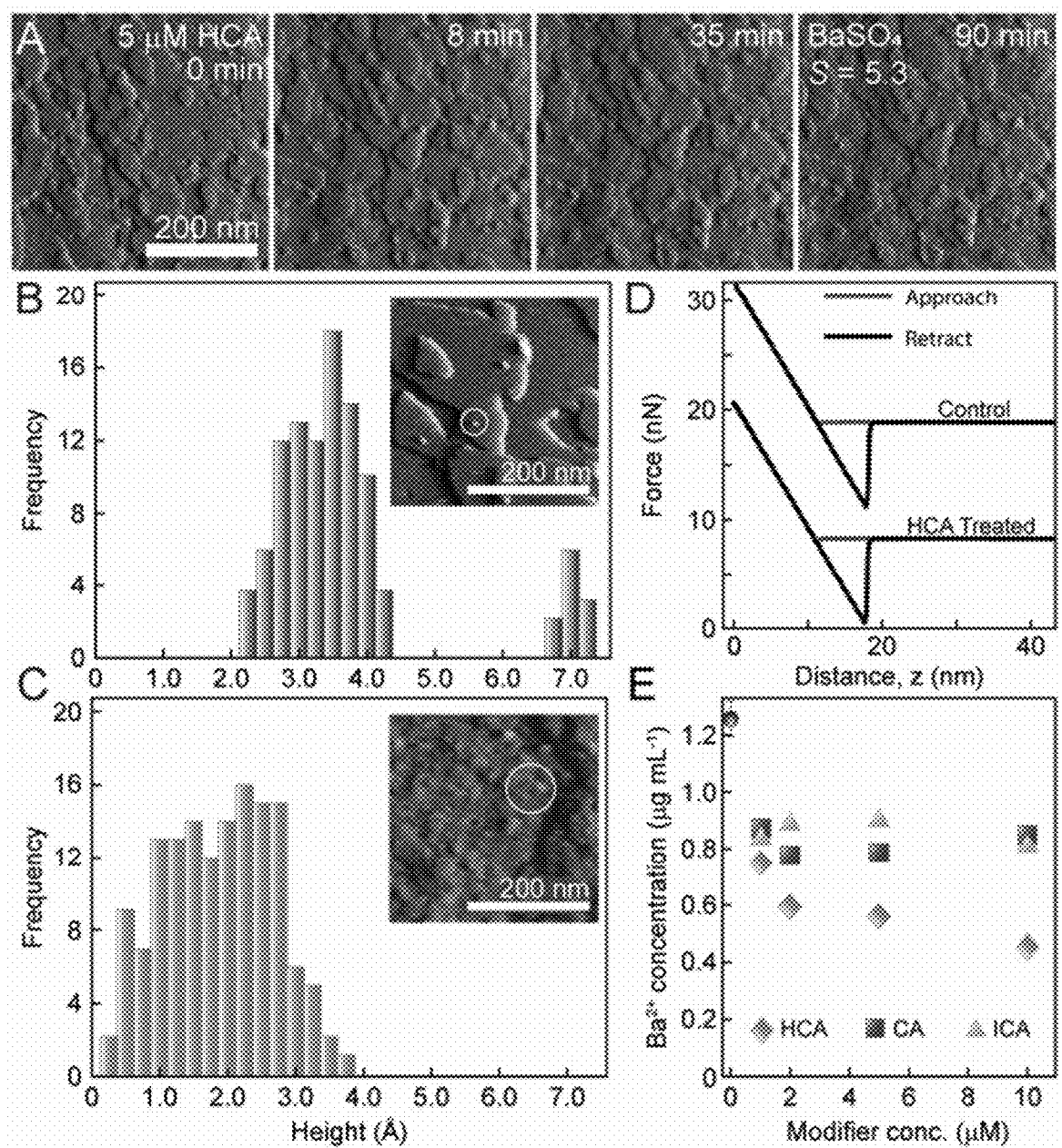
FIG. 5 shows (A) time-elapsed in situ AFM images of (001) barite surface growth suppression in the presence of 5 µM HCA after 35 min, (B) distribution of 2D nuclei height on a (001) barite surface in a supersaturated solution (S=5.3) without any additive, (C) Broad distribution of feature heights on a barite (001) surface exposed to a growth solution (supersaturation ratio S=5.3) containing 5 µM HCA, (D) Chemical force microscopy measurements with a non-functionalized AFM tip on a barite surface before (top, control) and after treatment with 5 µM HCA (bottom), (E) ICP-MS measurements of barium ion concentration in supernatant solutions extracted from dissolution assays under quiescent conditions where 50±2 mg of natural barite was exposed to an undersaturated solution (pH 7) containing different modifier concentration.

Irreversible Inhibition of Barite Growth. The effects of barite (001) surface exposure to HCA was further investigated as a means of better understanding the mechanism governing irreversible inhibition of layered growth. In the presence of HCA, barite crystal surfaces become laden with small features (protrusions) that suppress step advancement. FIG. 5A shows time-elapsed in situ AFM images of (001) barite surface growth suppression in the presence of 5 µM HCA after different amounts of time. Regeneration in fresh growth solution did not reveal surface growth recovery after 55 min of imaging (total 90-min period of inhibition and recovery). Snapshots from a movie reveal that the layer growth on the barite surface is fully arrested within 8 min of imaging with no evidence of continued formation of surface features after 35 min. Attempts to recover surface growth via the introduction of a supersaturated barium sulfate solution resulted in no visible changes to surface features (FIG. 5A, 90 min). The experiment was continued over 12 h with continuous supply of fresh growth solution to the AFM sample cell. After 6 h of intermittent imaging transient features were observed with heights smaller than a single step and modes of feature changes that did not resemble classical island or layered surface growth. After 12 hours, only minor changes were observed in surface topography, such as large features with highly corrugated steps resembling a barite growth hillock, and within the timeframe of measurement, growth was not restored to its original value before exposure of crystal surfaces to HCA. This sustained (irreversible) growth inhibition was observed over a range of supersaturation ratios used for AFM (supersaturation ratio S=5.3) and microfluidics (S=6.5) experiments.

Topographical analysis of barite (001) surfaces grown in the absence of modifier and in the presence of 5 µM HCA revealed distinct differences in the distributions of surface feature heights. FIG. 5B shows distribution of 2D nuclei height on a (001) barite surface in a supersaturated solution (supersaturation ratio S=5.3) without any additive. The bimodal distribution corresponds to a large population of single layers (height=c/2) and a small number of double layers with heights corresponding to one unit cell. The inset shows a representative AFM image showing a 2D nuclei (yellow circle). FIG. 5C shows a broad distribution of feature heights on a barite (001) surface exposed to a growth solution (S=5.3) containing 5 µM HCA. The inset shows a representative AFM image showing that these features correspond to protrusions (yellow circle) with heights much smaller than single layers. Nucleation of islands leads to a population of single layers with a Gaussian distribution centered around a step height of 3.2 Å (approximately c/2) and a small population of double layers. The height distribution for protrusions observed on barite surfaces exposed to HCA is much broader and the average height (1.6±0.8) is one-half that of the control (FIG. 5C). To test whether these small protrusions on barite (001) are either gel- or solid-like in structure, chemical force microscopy (CFM) was performed. In the CFM experiment, the measured AFM tip-crystal approach and retraction profiles are characteristic of hard surfaces. FIG. 5D shows chemical force microscopy (CFM) measurements with a non-functionalized AFM tip on a barite surface before (top, control) and after treatment with 5 µM HCA (bottom). Approach (red) and retraction (black) force curves are plotted as a function of distance z normal to the crystal surface (offset in the y-axis for clarity). Experiments were performed in supersaturated solution with each curve representing 10 total measurements per sample (each with nearly equivalent profiles). There is no appreciable difference between surfaces exposed to a pure growth solution (FIG. 5D, top) and those exposed to HCA (FIG. 5D, bottom). For instance, interfaces with soft or gel-like properties exhibit nonlinear profiles, which is not observed in CFM profiles for barite. Thus, this result indicates that the surface features induced by HCA are solid-like.

All three modifiers promote the formation of protrusions on barite crystals to suppress growth; however, this effect is reversible for ICA and CA within a short period of time during regeneration. To quantify the degree of reversibility, the solubility of natural barite crystals was measured in the presence of varying concentrations of HCA, CA, and ICA. A fixed mass of crystals (ca. 50 mg) was placed in an aqueous solution; the crystals dissolved until equilibrium was reached, as determined through measurements of the $Ba^{2+}$ ion concentration in the solution over 14 days of incubation at room temperature. FIG. 5E shows ICP-MS measurements of barium ion concentration in supernatant solutions extracted from dissolution assays under quiescent conditions where 50±2 mg of natural barite was exposed to an undersaturated solution (pH 7) containing different modifier concentration (note that error bars are smaller than the symbols). The control is indicated by a grey circle. In the absence of modifiers (control), saturation occurs around 1.3 µg $Ba^{2+}$ $mL^{-1}$. Introduction of modifiers decreases the solubility with no apparent trends for increasing concentrations of ICA and CA; however, there is a monotonic reduction in $Ba^{2+}$ ion concentration with increasing HCA concentration (diamonds in FIG. 5E). This result suggests that HCA adsorption on barite surfaces impedes dissolution, leading to an undersaturated (metastable) solution with respect to $Ba^{2+}$ ion concentration. Owing to the poor ability of HCA to chelate $Ba^{2+}$ ions, the decrease in $Ba^{2+}$ availability is attributed to HCA adsorption on barite surfaces. These results are consistent with AFM measurements showing irreversible inhibition of barite (001) surfaces at moderate supersaturation (S<6). In parallel, bulk crystallization and microfluidic assays required higher supersaturation (e.g. S≥7) to observe appreciable growth within a reasonable timeframe (i.e. order of hours). Under conditions of higher supersaturation, we observed partial recovery of barite growth where a regeneration procedure restored growth rates to only 60-70% of their original value prior to exposing barite crystals to HCA. This result indicates sustained 30-40% crystal growth inhibition (relative to the original rate of growth) owing to HCA's irreversible effect on barite crystallization.

In summary, the performance of citrate and two homologous analogues were compared to assess their relative effect on barite crystallization. Findings reveal that hydroxycitrate, a molecule differing from others by the presence of one additional alcohol group, is the most effective crystallization inhibitor with a distinct mode of action relative to citrate and isocitrate. Evidence is provided that barite nucleation occurs through a classical mechanism, seemingly in accordance with the Szilard postulate stating that solutes from a supersaturated medium join a nucleus or a growing crystal individually. It was observed that HCA completely suppresses solute assembly into pre-nucleation clusters, which is surprising given that nucleation is a stochastic process. Indeed, there are few examples of modifiers capable of blocking nucleation. Experiments also show that HCA also has the ability to fully suppress barite crystal growth. Moreover, it was shown that growth inhibition is sustained after removing HCA, leading to irreversible reduction in the rate of barite crystallization. This multiple action of crystal nucleation and sustained growth inhibition is rare, especially for barite crystallization.

The exact mechanism by which HCA suppresses barite crystallization is not fully understood. Specifically, the structure and composition of protrusions that form on the surface of barite crystals in the presence of HCA is unknown. Using AFM, it was shown that these features are solid-like with heights much smaller than single layers of barite crystals. The fact that these features persist during periods of regeneration to impart sustained (irreversible) inhibition suggests the crystal lattice is strained, possibly by incorporation of HCA and/or amorphous protrusions into barite crystals during growth regeneration. In general, crystal growth regeneration after exposure to a modifier is not widely tested in literature. Furthermore, among the few studies that have conducted regeneration assays, the effects of modifiers tend to be reversible: specifically, the rate of crystal growth is restored to its original value once residual modifier is desorbed from the crystal surfaces.

Factors differentiating whether a modifier has a reversible or irreversible effect on crystallization remain elusive; however, it is evident that the sustained inhibition of crystal growth after removing HCA from the supersaturated medium is a distinct characteristic among known modifiers of barite crystallization. Findings indicate that HCA is a versatile disruptor of barite crystallization owing to its dual mode of action as a potent inhibitor of nucleation and growth. The ability of HCA to suppress nucleation has the potential to delay scale formation, making this naturally-derived compound a promising alternative to commercial compounds used for scale prevention. Moreover, the irreversible action of HCA on the barite crystal growth rate indicates that this modifier may not have to be continuously supplied to the site of scale formation, which can potentially reduce operating costs associated with scale prevention.

REFERENCES

The following documents are incorporated by referenced herein.
1. Yu, S.-H.; Antonietti, M.; Cölfen, H.; Hartmann, J., Growth and self-assembly of BaCrO4 and BaSO4 nanofibers toward hierarchical and repetitive superstructures by polymer-controlled mineralization reactions. *Nano Letters* 2003, 3 (3), 379-382.
2. Weiner, S.; Addadi, L., Crystallization pathways in biomineralization. *Annual Review of Materials Research* 2011, 41, 21-40.
3. Weiner, S., Biomineralization: A structural perspective. *Journal of Structural Biology* 2008, 163 (3), 229-234.
4. Tambutté, S.; Holcomb, M.; Ferrier-Pagès, C.; Reynaud, S.; Tambutte, E.; Zoccola, D.; Allemand, D., Coral biomineralization: from the gene to the environment. *Journal of Experimental Marine Biology and Ecology* 2011, 408 (1-2), 58-78.
5. Smeets, P. J.; Cho, K. R.; Kempen, R. G.; Sommerdijk, N. A.; De Yoreo, J. J., Calcium carbonate nucleation driven by ion binding in a biomimetic matrix revealed by in situ electron microscopy. *Nature Materials* 2015, 14 (4), 394-399.
6. Qi, L.; Cölfen, H.; Antonietti, M.; Li, M.; Hopwood, J. D.; Ashley, A. J.; Mann, S., Formation of BaSO4 fibres with morphological complexity in aqueous polymer solutions. *Chemistry—A European Journal* 2001, 7 (16), 3526-3532.
7. Qi, L.; Cölfen, H.; Antonietti, M., Control of barite morphology by double-hydrophilic block copolymers. *Chemistry of Materials* 2000, 12 (8), 2392-2403.
8. Li, M.; Cölfen, H.; Mann, S., Morphological control of BaSO 4 microstructures by double hydrophilic block copolymer mixtures. *Journal of Materials Chemistry* 2004, 14 (14), 2269-2276.
9. Dove, P. M.; De Yoreo, J. J.; Weiner, S., *Biomineralization*. Walter de Gruyter GmbH & Co KG: 2018; Vol. 54.
10. De Yoreo, J. J.; Gilbert, P. U.; Sommerdijk, N. A.; Penn, R. L.; Whitelam, S.; Joester, D.; Zhang, H.; Rimer, J. D.; Navrotsky, A.; Banfield, J. F., Crystallization by particle attachment in synthetic, biogenic, and geologic environments. *Science* 2015, 349 (6247), aaa6760.
11. Aizenberg, J.; Lambert, G.; Weiner, S.; Addadi, L., Factors involved in the formation of amorphous and crystalline calcium carbonate: a study of an ascidian skeleton. *Journal of the American Chemical Society* 2002, 124 (1), 32-39.
12. Aizenberg, J., Crystallization in patterns: a bio-inspired approach. *Advanced Materials* 2004, 16 (15), 1295-1302.
13. Addadi, L.; Berman, A.; Moradian-Oldak, J.; Weiner, S., Tuning of crystal nucleation and growth by proteins: molecular interactions at solid-liquid interfaces in biomineralization. *Croatica Chemica Acta* 1990, 63 (3), 539-544.
14. Olafson, K. N.; Nguyen, T. Q.; Rimer, J. D.; Vekilov, P. G., Antimalarials inhibit hematin crystallization by unique drug—surface site interactions. *Proceedings of the National Academy of Sciences* 2017, 114 (29), 7531-7536.
15. Olafson, K. N.; Ketchum, M. A.; Rimer, J. D.; Vekilov, P. G., Mechanisms of hematin crystallization and inhibition by the antimalarial drug chloroquine. *Proceedings of the National Academy of Sciences* 2015, 112 (16), 4946-4951.
16. Ma, W.; Lutsko, J. F.; Rimer, J. D.; Vekilov, P. G., Antagonistic cooperativity between crystal growth modifiers. *Nature* 2020, 577 (7791), 497-501.
17. Kim, D.; Olympiou, C.; McCoy, C. P.; Irwin, N. J.; Rimer, J. D., Time-Resolved Dynamics of Struvite Crystallization: Insights from the Macroscopic to Molecular Scale. *Chemistry—A European Journal* 2020, 26 (16), 3555-3563.
18. Kim, D.; Moore, J.; McCoy, C. P.; Irwin, N. J.; Rimer, J. D., Engaging a Battle on Two Fronts: Dual Role of Polyphosphates as Potent Inhibitors of Struvite Nucleation and Crystal Growth. *Chemistry of Materials* 2020, 32 (19), 8672-8682.
19. Chung, J.; Taylor, M. G.; Granja, I.; Asplin, J. R.; Mpourmpakis, G.; Rimer, J. D., Factors differentiating the effectiveness of polyprotic acids as inhibitors of calcium oxalate crystallization in kidney stone disease. *Crystal Growth & Design* 2018, 18 (9), 5617-5627.
20. Chung, J.; Sosa, R.; Rimer, J. D., Elucidating the Effects of Polyprotic Acid Speciation in Calcium Oxalate Crystallization. *Crystal Growth & Design* 2017, 17 (8), 4280-4288.
21. Abd-El-Khalek, D.; Abd-El-Nabey, B.; Abdel-kawi, M. A.; Ebrahim, S.; Ramadan, S., The inhibition of crystal growth of gypsum and barite scales in industrial water systems using green antiscalant. *Water Supply* 2019, 19 (7), 2140-2146.

22. Bageri, B. S.; Mahmoud, M. A.; Shawabkeh, R. A.; Al-Mutairi, S. H.; Abdulraheem, A., Toward a Complete Removal of Barite (Barium Sulfate BaSO4) Scale Using Chelating Agents and Catalysts. *Arabian Journal for Science and Engineering* 2017, 42 (4), 1667-1674.

23. Bassioni, G., Mechanistic aspects on the influence of inorganic anion adsorption on oilfield scale inhibition by citrate. *Journal of Petroleum Science and Engineering* 2010, 70 (3-4), 298-301.

24. Brown, A.; Merrett, S.; Putnam, J. In *Coil-Tubing Milling/Underreaming of Barium Sulphate Scale and Scale Control in the Forties Field*, Offshore Europe, Society of Petroleum Engineers: 1991.

25. Bukuaghangin, O.; Neville, A.; Charpentier, T. In *Scale Formation in Multiphase Conditions*, Proceedings of the Oil Field Chemistry Symposium, Gielo, 2015.

26. Charlesworth, M.; Kalli, C. J.; Thomas, D. G.; Shi, W.; Graham, B. F.; Aman, Z. M.; May, E. F. Compositions and methods for scale inhibition. US 0221849, 2016.

27. Kenneth Stuart Sorbie, N. L. In *How scale inhibitors work—Mechanisms of selected barium sulphate scale inhibitors across a wide temperature range*, SPE Sixth International Symposium on Oilfield Scale; Exploring the Boundaries of Scale Control, Aberdeen, Scotland, United Kingdom, Aberdeen, Scotland, United Kingdom, 2004.

28. Mady, M. F.; Bayat, P.; Kelland, M. A., Environmentally-Friendly Phosphonated Polyetheramine Scale Inhibitors-Excellent Calcium Compatibility for Oilfield Applications. *Industrial & Engineering Chemistry Research* 2020.

29. Reynolds, M. A., A Technical Playbook for Chemicals and Additives Used in the Hydraulic Fracturing of Shales. *Energy & Fuels* 2020, 34 (12), 15106-15125.

30. Mike Crabtree, D. E., Phil Fletcher, Matt Miller, Ashley Johnson, George King Fighting Scale—Removal and Prevention. *Oilfield Review* 1999, 30-45.

31. Blount, C. W., Barite solubilities and thermodynamic quantities up to 300 C and 1400 bars. *American Mineralogist* 1977, 62, 942-957.

32. Abdelgawad, K.; Mahmoud, M.; Elkatatny, S.; Patil, S. In *Effect of Calcium Carbonate on Barite Solubility Using a Chelating Agent and Converter*, SPE International Conference on Oilfield Chemistry, Society of Petroleum Engineers: 2019.

33. Van Driessche, A. E.; Benning Lg Fau-Rodriguez-Blanco, J. D.; Rodriguez-Blanco Jd Fau-Ossorio, M.; Ossorio M Fau-Bots, P.; Bots P Fau-García-Ruiz, J. M.; García-Ruiz, J. M., The role and implications of bassanite as a stable precursor phase to gypsum precipitation. (1095).

34. Sommerdijk, N. A. J. M.; With, G. d., Biomimetic CaCO3 Mineralization using Designer Molecules and Interfaces. *Chemical Reviews* 2008, 108 (11), 4499-4550.

35. Gower, L. B., Biomimetic Model Systems for Investigating the Amorphous Precursor Pathway and Its Role in Biomineralization. *Chemical Reviews* 2008, 108 (11), 4551-4627.

36. Gebauer, D.; Völkel, A.; Cölfen, H., Stable Prenucleation Calcium Carbonate Clusters. *Science* 2008, 322 (5909), 1819-1822.

37. Bots, P.; Benning, L. G.; Rodriguez-Blanco, J.-D.; Roncal-Herrero, T.; Shaw, S., Mechanistic Insights into the Crystallization of Amorphous Calcium Carbonate (ACC). *Crystal Growth & Design* 2012, 12 (7), 3806-3814.

38. Pina, C.; Putnis, C. V.; Becker, U.; Biswas, S.; Carroll, E.; Bosbach, D.; Putnis, A., An atomic force microscopy and molecular simulations study of the inhibition of barite growth by phosphonates. *Surface Science* 2004, 553 (1-3), 61-74.

39. Jones, F.; Oliveira, A.; Rohl, A.; Parkinson, G.; Ogden, M.; Reyhani, M., Investigation into the effect of phosphonate inhibitors on barium sulfate precipitation. *Journal of Crystal Growth* 2002, 237, 424-429.

40. Coveney, P. V.; Davey, R.; Griffin, J. L.; He, Y.; Hamlin, J. D.; Stackhouse, S.; Whiting, A., A new design strategy for molecular recognition in heterogeneous systems: a universal crystal-face growth inhibitor for barium sulfate. *Journal of the American Chemical Society* 2000, 122 (46), 11557-11558.

41. Black, S. N.; Bromley, L. A.; Cottier, D.; Davey, R. J.; Dobbs, B.; Rout, J. E., Interactions at the organic/inorganic interface: binding motifs for phosphonates at the surface of barite crystals. *Journal of the Chemical Society, Faraday Transactions* 1991, 87 (20), 3409-3414.

42. Baynton, A.; Ogden, M. I.; Raston, C. L.; Jones, F., Barium sulfate crystallization dependence on upper rim calix [4] arene functional groups. *CrystEngComm* 2012, 14 (3), 1057-1062.

43. Grohe, B.; O'Young, J.; Langdon, A.; Karttunen, M.; Goldberg, H. A.; Hunter, G. K., Citrate Modulates Calcium Oxalate Crystal Growth by Face-Specific Interactions. *Cells Tissues Organs* 2011, 194 (2-4), 176-181.

44. Farmanesh, S.; Ramamoorthy, S.; Chung, J.; Asplin, J. R.; Karande, P.; Rimer, J. D., Specificity of growth inhibitors and their cooperative effects in calcium oxalate monohydrate crystallization. *Journal of the American Chemical Society* 2014, 136 (1), 367-376.

45. Myerson, A., *Handbook of industrial crystallization*. Butterworth-Heinemann: 2002.

46. Chernov, A. A., Growth Mechanisms. In *Modern crystallography III*, Springer: 1984; pp 104-158.

47. Wierzbicki, A.; Sikes, C. S.; Sallis, J. D.; Madura, J. D.; Stevens, E. D.; Martin, K. L., Scanning electron microscopy and molecular modeling of inhibition of calcium oxalate monohydrate crystal growth by citrate and phosphocitrate. *Calcified Tissue International* 1995, 56 (4), 297-304.

48. Wang, L.; Zhang, W.; Qiu, S. R.; Zachowicz, W. J.; Guan, X.; Tang, R.; Hoyer, J. R.; Yoreo, J. J. D.; Nancollas, G. H., Inhibition of calcium oxalate monohydrate crystallization by the combination of citrate and osteopontin. *Journal of Crystal Growth* 2006, 291 (1), 160-165.

49. Tiselius, H.-G.; Fornander, A.-M.; Nilsson, M.-A., The effects of citrate and urine on calcium oxalate crystal aggregation. *Urological Research* 1993, 21 (5), 363-366.

50. Qiu, S. R.; Wierzbicki, A.; Orme, C. A.; Cody, A. M.; Hoyer, J. R.; Nancollas, G. H.; Zepeda, S.; De Yoreo, J. J., Molecular modulation of calcium oxalate crystallization by osteopontin and citrate. *Proceedings of the National Academy of Sciences* 2004, 101 (7), 1811-1815.

51. Hess, B.; Zipperle, L.; Jaeger, P., Citrate and calcium effects on Tamm-Horsfall glycoprotein as a modifier of calcium oxalate crystal aggregation. *The American Journal of Physiology* 1993, 265 (6), F784-F791.

52. Zhang, W.; Li, H.-J.; Chen, L.; Sun, J.; Ma, X.; Li, Y.; Liu, C.; Han, X.; Pang, B.; Wu, Y.-C., Performance and mechanism of a composite scaling—corrosion inhibitor used in seawater: 10-Methylacridinium iodide and sodium citrate. *Desalination* 2020, 486, 114482.

53. Toujas, S.; Vazquez, M.; Valcarce, M. B., Unexpected effect of citrate ions on the corrosion process of carbon steel in alkaline solutions. *Corrosion Science* 2017, 128, 94-99.
54. Sobhi, M.; Abdallah, M.; Khairou, K. S., Sildenafil citrate (Viagra) as a corrosion inhibitor for carbon steel in hydrochloric acid solutions. *Monatshefte für Chemie—Chemical Monthly* 2012, 143 (10), 1379-1387.
55. Serdaroğlu, G.; Kaya, S.; Touir, R., Eco-friendly sodium gluconate and trisodium citrate inhibitors for low carbon steel in simulated cooling water system: Theoretical study and molecular dynamic simulations. *Journal of Molecular Liquids* 2020, 319, 114108.
56. Rachid, T.; Hayat, L., Tri-Sodium Citrate as Corrosion and Scale Inhibitor of Mild Steel in Synthetic Cooling Water System. In *New Challenges and Industrial Applications for Corrosion Prevention and Control*, Younes El, K.; Savas, K.; Rachid, T., Eds. IGI Global: Hershey, PA, USA, 2020; pp 16-39.
57. Müller, B., Citric acid as corrosion inhibitor for aluminium pigment. *Corrosion Science* 2004, 46 (1), 159-167.
58. Hajfathalian, M.; Gilroy, K. D.; Hughes, R. A.; Neretina, S., Citrate-Induced Nanocubes: A Re-Examination of the Role of Citrate as a Shape-Directing Capping Agent for Ag-Based Nanostructures. *Small* 2016, 12 (25), 3444-3452.
59. Grys, D.-B.; de Nijs, B.; Salmon, A. R.; Huang, J.; Wang, W.; Chen, W.-H.; Scherman, O. A.; Baumberg, J. J., Citrate Coordination and Bridging of Gold Nanoparticles: The Role of Gold Adatoms in AuNP Aging. *ACS Nano* 2020, 14 (7), 8689-8696.
60. Bastús, N. G.; Comenge, J.; Puntes, V., Kinetically Controlled Seeded Growth Synthesis of Citrate-Stabilized Gold Nanoparticles of up to 200 nm: Size Focusing versus Ostwald Ripening. *Langmuir* 2011, 27 (17), 11098-11105.
61. Liu, X.; Yuan, P.; Sun, X.; Chen, Z., Hydroxycitric Acid Inhibits Renal Calcium Oxalate Deposition by Reducing Oxidative Stress and Inflammation. *Current Molecular Medicine* 2020, 20 (7), 527-535.
62. Hsu, Y.-C.; Lin, Y.-H.; Shiau, L.-D., Effects of Various Inhibitors on the Nucleation of Calcium Oxalate in Synthetic Urine. *Crystals* 2020, 10 (4), 333.
63. Han, S.; Zhao, C.; Pokhrel, G.; Sun, X.; Chen, Z.; Xu, H., Hydroxycitric Acid Tripotassium Inhibits Calcium Oxalate Crystal Formation in the *Drosophila melanogaster* Model of Hyperoxaluria. *Medical Science Monitor* 2019, 25, 3662-3667.
64. Chen, W.-C.; Chen, H.-Y.; Lin, W.-Y.; Yang, Y.-R.; Tsai, M.-Y.; Chen, Y.-H., Inhibitory Effect of Hydroxycitrate on Calcium Oxalate Crystal Formation in a Drosophila Model. *Journal of Food and Nutrition Research* 2018, 6 (11), 706-709.
65. Ahmed, A.; Rodgers, A. L.; Elmagbari, F.; Jackson, G. E., In support of hydroxycitrate being clinically investigated as a potential therapy of calcium nephrolithiasis: Theoretical modelling and in vitro investigation of thermodynamic effects. *Journal of Crystal Growth* 2021, 558, 125956.
66. Li, M.; Zhang, J.; Wang, L.; Wang, B.; Putnis, C. V., Mechanisms of Modulation of Calcium Phosphate Pathological Mineralization by Mobile and Immobile Small-Molecule Inhibitors. *The Journal of Physical Chemistry B* 2018, 122 (5), 1580-1587.
67. Chung, J.; Granja, I.; Taylor, M. G.; Mpourmpakis, G.; Asplin, J. R.; Rimer, J. D., Molecular modifiers reveal a mechanism of pathological crystal growth inhibition. *Nature* 2016, 536 (7617), 446-450.
68. Sosa, R. D.; Geng, X.; Reynolds, M. A.; Rimer, J. D.; Conrad, J. C., A microfluidic approach for probing hydrodynamic effects in barite scale formation. *Lab on a Chip* 2019, 19 (9), 1534-1544.
69. Geng, X.; Sosa, R. D.; Reynolds, M. A.; Conrad, J. C.; Rimer, J. D., Alginate as a green inhibitor of barite nucleation and crystal growth. *Molecular Systems Design & Engineering* 2021.
70. Vekilov, P. G., Nucleation. *Crystal Growth & Design* 2010, 10 (12), 5007-5019.
71. Vekilov, P. G., The two-step mechanism of nucleation of crystals in solution. *Nanoscale* 2010, 2 (11), 2346-2357.
72. Vekilov, P. G., Dense Liquid Precursor for the Nucleation of Ordered Solid Phases from Solution. *Crystal Growth & Design* 2004, 4 (4), 671-685.
73. Gebauer, D.; Kellermeier, M.; Gale, J. D.; Bergström, L.; Cölfen, H., Pre-nucleation clusters as solute precursors in crystallisation. *Chemical Society Reviews* 2014, 43 (7), 2348-2371.
74. Erdemir, D.; Lee, A. Y.; Myerson, A. S., Nucleation of Crystals from Solution: Classical and Two-Step Models. *Accounts of Chemical Research* 2009, 42 (5), 621-629.
75. De Yoreo, J. J.; Vekilov, P. G., Principles of Crystal Nucleation and Growth. *Reviews in Mineralogy and Geochemistry* 2003, 54 (1), 57-93.
76. Thiele, N. A.; MacMillan, S. N.; Wilson, J. J., Rapid Dissolution of BaSO4 by Macropa, an 18-Membered Macrocycle with High Affinity for Ba2+. *Journal of the American Chemical Society* 2018, 140 (49), 17071-17078.
77. Bliznakov, G., Adsorption et croissance cristalline. *Editions du CNRS* 1965, 291-301.
78. Markov, I. V., *Crystal Growth for Beginners*.
79. Olafson, K. N.; Clark, R. J.; Vekilov, P. G.; Palmer, J. C.; Rimer, J. D., Structuring of Organic Solvents at Solid Interfaces and Ramifications for Antimalarial Adsorption on β-Hematin Crystals. *ACS Applied Materials & Interfaces* 2018, 10 (35), 29288-29298.
80. Choudhary, M. K.; Kumar, M.; Rimer, J. D., Regulating Nonclassical Pathways of Silicalite-1 Crystallization through Controlled Evolution of Amorphous Precursors. *Angewandte Chemie International Edition* 2019, 131 (44), 15859-15863.
81. Gutzow, I. S.; Schmelzer, J. W. P., Kinetics of Crystallization and Segregation: Nucleation in Glass-Forming Systems. In *The Vitreous State: Thermodynamics, Structure, Rheology, and Crystallization*, Springer Berlin Heidelberg: Berlin, Heidelberg, 2013; pp 219-288.
82. Nene, S. S.; Hunter, G. K.; Goldberg, H. A.; Hutter, J. L., Reversible Inhibition of Calcium Oxalate Monohydrate Growth by an Osteopontin Phosphopeptide. *Langmuir* 2013, 29 (21), 6287-6295.
83. Sosa, R. D.; Geng, X.; Agarwal, A.; Palmer, J. C.; Conrad, J. C.; Reynolds, M. A.; Rimer, J. D., Acidic Polysaccharides as Green Alternatives for Barite Scale Dissolution. *ACS Applied Materials & Interfaces* 2020, 12 (49), 55434-55443.
84. Alderighi, L.; Gans, P.; Ienco, A.; Peters, D.; Sabatini, A.; Vacca, A., Hyperquad simulation and speciation (HySS): a utility program for the investigation of equilibria involving soluble and partially soluble species. *Coordination Chemistry Reviews* 1999, 184 (1), 311-318.
85. Martell, A. E.; Smith, R. M., *Critical stability constants*. Springer: 1974; Vol. 1.

86. Safari, M. S.; Byington, M. C.; Conrad, J. C.; Vekilov, P. G., Polymorphism of Lysozyme Condensates. *The Journal of Physical Chemistry B* 2017, 121 (39), 9091-9101.

What is claimed is:

1. A method for inhibiting formation of mineral scale in a system, wherein the system comprises surfaces in contact with a liquid, comprising:
adding an amount of inhibitor to the liquid in the system, wherein the inhibitor comprises hydroxycitrate, wherein the inhibitor is present in the liquid at a concentration of 250 nM to 10 µM, to inhibit or suppress the formation of mineral scale on the surfaces in contact with the liquid; and
maintaining the inhibitor in the system for a short period of exposure time.

2. The method of claim 1, wherein the short period of exposure time is less than ten minutes.

3. The method of claim 1, further comprising the step of removing the inhibitor from the liquid in the system for a further period of time, whereby the formation of mineral scale on the surfaces in the system remains irreversibly inhibited or suppressed.

4. The method of claim 3, further comprising the step of adding an additional amount of inhibitor to the system for an additional short period of time, whereby the formation of mineral scale on the surfaces in the system remains irreversibly inhibited or suppressed.

5. The method of claim 1, wherein the inhibitor is present in the liquid at a concentration of 1 µM to 5 µM.

6. The method of claim 1, wherein the inhibitor is present in the liquid at a concentration of 2 µM.

7. The method of claim 1, wherein the liquid is water.

8. The method of claim 1, wherein the system is a water treatment, energy production, or manufacturing system.

9. The method of claim 1, wherein the inhibitor further comprises one or more of isocitrate (ICA) and citric acid (CA).

10. The method of claim 1, wherein the mineral scale comprises barium.

11. A method for inhibiting formation of mineral scale in a system, wherein the system comprises surfaces in contact with a liquid, comprising:
depositing a layer of hydroxycitrate on the surfaces in contact with the liquid by adding an amount of hydroxycitrate to the liquid in the system, wherein the hydroxycitrate is present in the liquid at a concentration of 250 nM to 10 µM, to inhibit or suppress the formation of mineral scale on the surfaces in contact with the liquid.

12. The method of claim 11, wherein the hydroxycitrate is present in the liquid at a concentration of 1 µM to 5 µM.

13. The method of claim 11, wherein the liquid is water.

14. The method of claim 11, wherein the system is a water treatment, energy production, or manufacturing system.

15. A formulation for inhibiting the formation of barium mineral scale in a system, wherein the system comprises surfaces in contact with a liquid, comprising:
one or more portions of hydroxycitrate for addition to the liquid in the system, wherein each portion of hydroxycitrate has a concentration sufficient to produce a concentration of 250 nM to 10 µM of hydroxycitrate in the liquid in the system after addition of the portion of hydroxycitrate to the liquid in the system.

16. The formulation of claim 15, wherein each portion of hydroxycitrate has a concentration sufficient to produce a concentration of 1 µM to 5 µM of hydroxycitrate in the liquid in the system after addition of the portion of hydroxycitrate to the liquid in the system.

17. The formulation of claim 15, wherein the liquid in the system is water.

18. The formulation of claim 15, wherein the system is a water treatment, energy production, or manufacturing system.

19. The formulation of claim 15, wherein the formulation comprises more than one portion of hydroxycitrate.

20. The formulation of claim 15, wherein the formulation further comprises one or more portions of isocitrate (ICA) or citric acid (CA).

* * * * *

UNITED STATES PATENT AND TRADEMARK OFFICE
CERTIFICATE OF CORRECTION

PATENT NO. : 12,024,452 B2
APPLICATION NO. : 17/878258
DATED : July 2, 2024
INVENTOR(S) : Jeffrey D. Rimer et al.

It is certified that error appears in the above-identified patent and that said Letters Patent is hereby corrected as shown below:

In the Specification

In Column 8, Line 10, delete "100" and insert -- 100 µS --, therefor.

In Column 9, Line 25, delete "(b direction)" and insert -- ($\vec{b}$ direction) --, therefor.

In Column 9, Line 26, delete "(c direction)," and -- ($\vec{c}$ direction), --, therefor.

In Column 9, Line 27, delete "(a direction)." and insert -- ($\vec{a}$ direction). --, therefor.

In Column 11, Line 48, delete "direction" and insert -- [010] direction --, therefor.

Signed and Sealed this
Twentieth Day of August, 2024

Katherine Kelly Vidal
*Director of the United States Patent and Trademark Office*